Nov. 7, 1961 A. P. SIMSON 3,007,626
SUPERCHARGER FOR COMPRESSOR UNITS
Filed April 4, 1957 2 Sheets-Sheet 1

INVENTOR.
Adolf P. Simson
BY
ATTORNEY

Nov. 7, 1961 A. P. SIMSON 3,007,626
SUPERCHARGER FOR COMPRESSOR UNITS
Filed April 4, 1957 2 Sheets-Sheet 2

INVENTOR.
Adolf P. Simson

United States Patent Office 3,007,626
Patented Nov. 7, 1961

3,007,626
SUPERCHARGER FOR COMPRESSOR UNITS
Adolf P. Simson, Quincy, Ill., assignor to Gardner-Denver Company, Quincy, Ill., a corporation of Delaware
Filed Apr. 4, 1957, Ser. No. 650,723
8 Claims. (Cl. 230—56)

This invention relates to air compressors and more particularly to engine driven portable compressor units. More specifically this invention relates to means for supercharging internal combustion type driving engines of portable air compressor units by a portion of the air compressed by the compressor.

It has long been known that when engine driven compressors are used at extreme altitudes that the efficiency of the engine and compressor decrease as the altitude increases.

Of primary significance in altitude operation of these compressor units is the effect of decreasing atmospheric pressure and air density on the operation of the engine. At altitudes above 9,000 feet, in the case of models tested by the inventor, the engine will frequently stall as it is loaded unless the idle speed of the engine is increased or the engine is supercharged in accordance with this invention. It is also obvious that high altitude operation of standard engines causes inefficient fuel combustion which in itself is wasteful of fuel and also results in the deposit of unconsumed carbon on the cylinder ports, valves and piston rings of the engine.

Accordingly, it is an object of this invention to provide means for restoring lower altitude operating conditions to engines driving air compressors at high altitudes.

It is a further object of this invention to provide means for supercharging the engines of portable air compressor units by taking a small amount of compressed air from the compressor assembly and admitting it to the air intake of the engine.

Further objects and purposes of this invention will become apparent upon reading the following specification and accompanying drawings in which.

Figure 2:
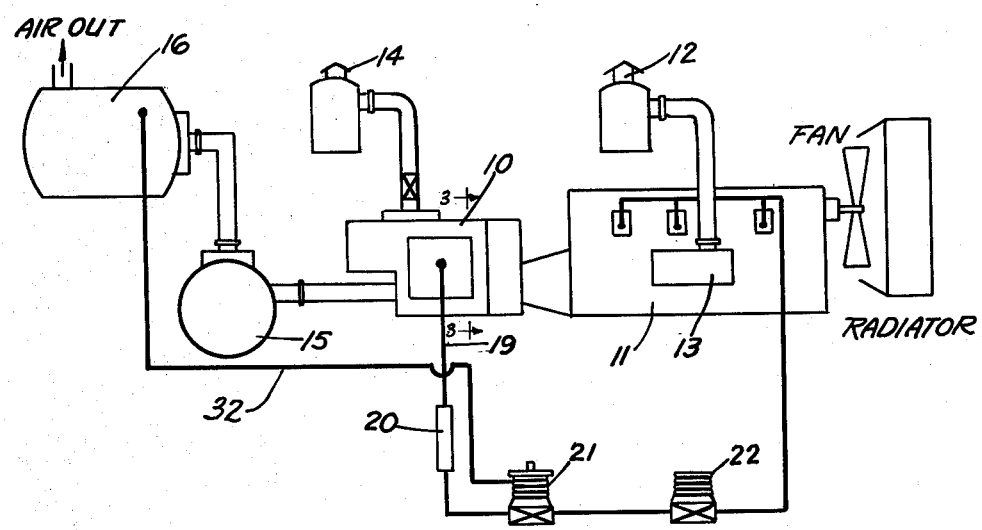
FIG. 2 is a diagrammatic representation of a portable compressor unit embodying a variation of the supercharger of FIG. 1 and including automatic controls for the operation thereof.
Figure 3:
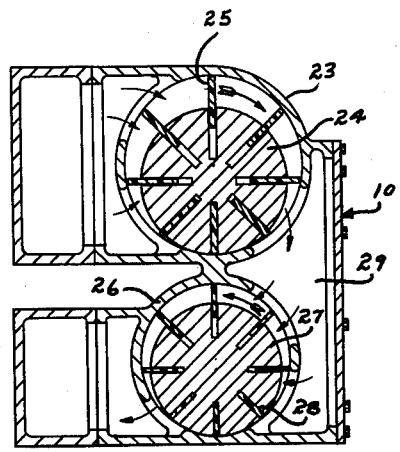
FIGURE 3 is a sectional view taken along the line 3—3 of FIGURE 2 in the direction of appended arrows.

Referring to the drawings the numeral 10 indicates an air compressor here shown as a sliding vane rotary type two-stage compressor. The compressor 10 may be a piston type, or other type, compressor and need not be a two-stage compressor except in the combination shown in FIGS. 2 and 3. Referring particularly to FIGS. 2 and 3, the compressor includes a first stage low pressure cylinder 23, having a rotor 24 and a plurality of sliding vanes 25, and a second stage high pressure cylinder 26, having a rotor 27 and sliding vanes 28. An interstage chamber 29 provides communication between the low pressure and high pressure cylinders. The compressor 10 is driven by an internal combustion engine 11. Air to support combustion in the engine is admitted through an air intake 12, conducted through a blower 13 and thence to an air box within the engine housing.

Air to be compressed is admitted to the compressor 10 through an air intake 14. Within the air compressor the air is compressed in two stages. For purposes of illustration, if the output pressure is to be 100 p.s.i., air in the low pressure cylinder 23 will be compressed to approximately 30 p.s.i. This partially compressed air is then conducted from the low pressure cylinder through the interstage chamber 29 to the high pressure cylinder 26 where it is further compressed to the ultimate discharge pressure. Air at discharge pressure is conducted from the compressor through an oil separator and filter 15 to an air receiver 16 where the compressed air is stored until needed.

As used in the present specification and claims, the terms "compressor," "compressor assembly" and "compressor unit" are defined as follows. The term "compressor" refers to the bare compressor 10. The term "compressor assembly" refers to the assembly of the compressor 10, the compressor air intake 14, the oil separator 15, the receiver 16, and associated conduits. The term "compressor unit" refers to the combination of the compressor assembly and the driving engine 11.

In compressor units of this type, the engine and compressor run at varying speeds and power output ranging from idling speed to full speed and power output as the demand for air from the receiver 16 varies. As mentioned above, at high altitudes, the engine is likely to stall as it is loaded and its speed increases from idling speed. Also as combustion is incomplete because of the lack of oxygen in the air, fuel is wasted and harmful carbon in the exhaust of the engine is deposited within the engine.

Figure 1:
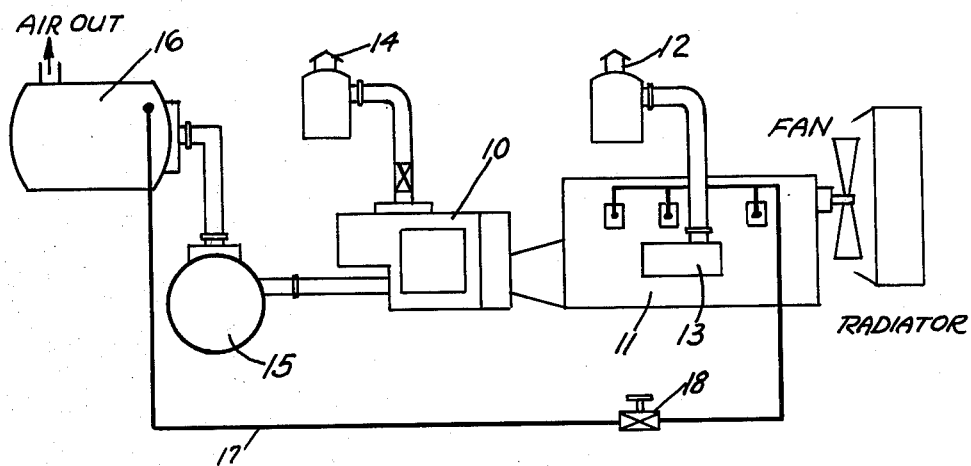
FIG. 1 is a diagrammatic representation of an engine driven portable air compressor unit embodying a supercharger in accordance with this invention.

To maintain near sea-level operating conditions for the engine, FIG. 1 shows an arrangement whereby air is bled from the air receiver 16 to the engine air box, not shown, by means of a conduit 17. A manual valve 18 controls the passage of air through the conduit 17.

In experiments at 13,900 feet elevation with a compressor unit having a rated output of 600 cubic feet of free air per minute at 100 p.s.i., only 31 c.f.m. of air bled from the air receiver was necessary to restore lower altitude conditions to the 159 horsepower diesel engine by which the compressor was driven. Although the bleeding of air from the air receiver will decrease the efficiency of the compressor, the increase in engine efficiency is more than compensatory in the overall efficiency of the unit.

FIG. 2 illustrates a supercharging arrangement similar to that of FIG. 1 except that the air is bled from the interstage chamber 29 between the low and high pressure cylinders 23 and 26 of the compressor 10. Certain automatic controls are also illustrated in FIG. 2 and will now be described. A conduit 19 conducts the air from the interstage chamber of the compressor through a filter and oil separator 20, as the air within the compressor is mixed with lubricating and cooling oil. A first pressure regulated valve 21 and a second pressure regulated valve 22 in the conduit 19 control the passage of air to the air box of the engine 11. The valve 21 is responsive to air pressure in the air receiver 16 through a conduit 32. Accordingly, when the air pressure in the receiver reaches a point where it causes the compressor to unload and the engine speed to be reduced, the valve 21 opens to provide additional air from the compressor 10 to the engine 11. With the engine idling the air pressure in the air receiver will decrease as a result of the demand for compressed air, until the pressure reaches a predetermined value when the compressor will be reloaded and the engine will accelerate. As the engine accelerates and picks up the load, the valve 21 closes so that at full engine and compressor output, no air is bled from the compressor.

The quantity of air furnished to the engine when the valve 21 is open is controlled by the second pressure regulated valve 22 which is responsive to atmospheric pressure. The valve 22 is controlled so that as the atmospheric pressure decreases the opening through the valve 22 increases.

With the arrangement shown in FIG. 2, air is taken from the compressor only when the engine is operating at idle or near idle speed so that, when maximum compressor and engine output are required, no air is taken from the compressor to interfere with its performance. In addition, the quantity of air used for supercharging the engine at low speeds is automatically regulated to the correct amount for the elevation at which the unit is operating.

Figure 4:
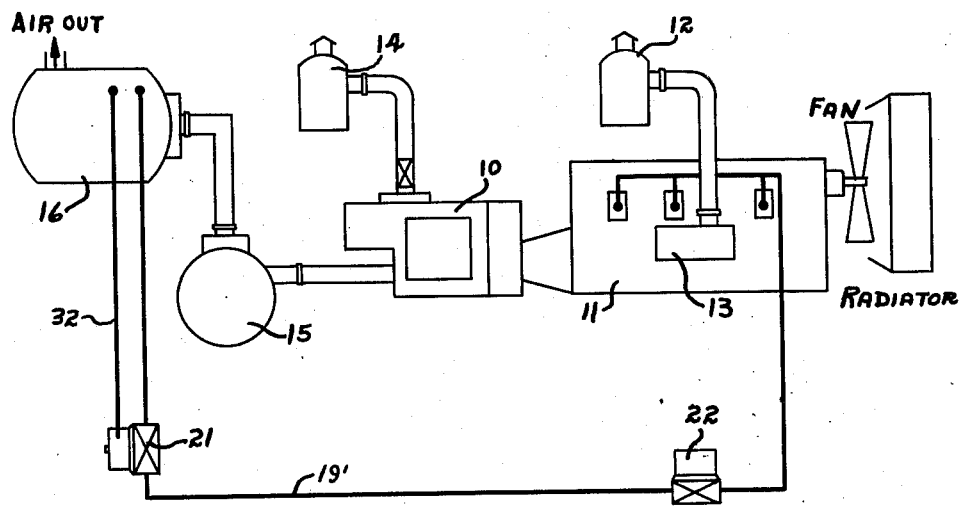
FIGURE 4 is a diagrammatic representation of a portable air compressor unit, similar to that of FIGURE 1, and including the automatic controls of FIGURE 2.

FIGURE 4 illustrates a supercharging arrangement similar to that of FIGURE 1, wherein air is bled from the receiver 16 to the engine 11 through a conduit 19'. A first pressure regulated valve 21 responsive to the receiver pressure through a conduit 32, controls the air flow through the conduit 19' as described with respect to the embodiment of FIGURE 2. A second pressure regulated valve 22, responsive to atmospheric pressure, controls the amount of air that may flow through the conduit 19' as described with respect to the embodiment of FIGURE 2. This supercharging arrangement operates identically to that of FIGURE 2 with the exception that air is bled from the receiver 16 rather than from the interstage chamber 29 of the compressor.

It will be obvious that the various features of the supercharging devices of FIGS. 1, 2 and 4 can be combined and interchanged all for the purpose of taking compressed air and injecting it into the air intake of the engine to improve the engine performance at high altitudes. It is also conceivable that there may be operating conditions other than those resulting from high altitudes when it will be desirable to supercharge an engine by air taken from the compressor assembly driven thereby. In any event, it will be obvious to one skilled in the art of air compressors and engines, that this invention lends itself to many variations and adaptations which will fall within the scope of the invention claimed.

I claim as my invention:

1. In combination with an air compressor unit comprising a compressor assembly and an internal combustion engine having an air intake system, said compressor assembly including an air compressor and a receiver for storing air compressed by said compressor, said engine driving said compressor and its power output being responsive to the pressure of air in said receiver; conduit means for directing air from said compressor assembly to said air intake system for supercharging said engine; and means responsive to the air pressure in said receiver for controlling the flow of air in said conduit means from said compressor assembly to said engine.

2. The combination set forth in claim 1 including means responsive to atmospheric pressure for controlling the maximum flow of air in said conduit means from said compressor assembly to said engine.

3. In combination with an air compressor unit comprising a compressor assembly and an internal combustion engine having an air intake system, said compressor assembly including an air compressor and a receiver for storing air compressed by said compressor, said engine driving said compressor and its power output being responsive to the pressure of air in said receiver; conduit means for directing air from said receiver to said air intake system of said engine for supercharging said engine; and means responsive to the air pressure in said receiver for controlling the flow of air in said conduit means from said receiver to said engine.

4. The combination set forth in claim 3 including means responsive to atmospheric pressure for controlling the maximum flow of air in said conduit means from said receiver to said engine.

5. In combination with an air compressor unit comprising a compressor assembly and an internal combustion engine having an air intake system, said compressor assembly including an air compressor and a receiver for storing air compressed by said compressor, said engine driving said compressor and its power output being responsive to the pressure of air in said receiver; conduit means for directing air from said receiver to said air intake system of said engine for supercharging said engine; valve means in said conduit means for controlling the flow of air from said receiver to said engine; said valve means being responsive to the air pressure in said receiver for permitting the flow of air from said receiver to said engine when the air pressure in said receiver increases to a predetermined value.

6. In combination with an air compressor unit comprising a compressor assembly and an internal combustion engine having an air intake system, said compressor assembly including an air compressor and a receiver for storing air compressed by said compressor, said engine driving said compressor, and the power output of said engine being decreased when the receiver pressure increases to a first predetermined value and the power output of said engine being increased when the receiver pressure decreases to a second predetermined value; conduit means for directing air from said receiver to said air intake system of said engine for supercharging said engine; and valve means responsive to the air pressure in said receiver for increasing the flow of air in said conduit means when said receiver pressure increases to said first predetermined value and for decreasing the flow of air in said conduit means when said receiver pressure decreases to said second predetermined value.

7. In combination with an air compressor unit comprising a compressor assembly and an internal combustion engine having an air intake system, said compressor assembly including an air compressor and a receiver for storing air compressed by said compressor, said compressor having low and high pressure chambers and an interstage chamber between said low and high pressure chambers, said engine driving said compressor and its power output being responsive to the pressure of air in said receiver; conduit means for directing air from said interstage chamber to said air intake system of said engine for supercharging said engine; and means responsive to the air pressure in said receiver for controlling the flow of air in said conduit means from said interstage chamber to said engine.

8. The combination set forth in claim 7 including means responsive to atmospheric pressure for controlling the maximum flow of air in said conduit means from said interstage chamber to said engine.

References Cited in the file of this patent

UNITED STATES PATENTS

| 1,645,178 | Hall-Brown | Oct. 11, 1927 |
| 1,732,405 | Invernizzi | Oct. 22, 1929 |
| 2,477,230 | Bell | July 26, 1949 |
| 2,516,911 | Reggio | Aug. 1, 1950 |
| 2,556,190 | Jorgensen et al. | June 12, 1951 |